June 20, 1961 E. RAY ET AL 2,988,874

FREE PISTON POWER CONVERSION DEVICES

Filed May 9, 1958 2 Sheets-Sheet 1

Inventors
EDWARD RAY
STEPHEN H. FAIRWEATHER

By Hill, Sherman, Meroni, Gross & Simpson Attys

FREE PISTON POWER CONVERSION DEVICES
Filed May 9, 1958
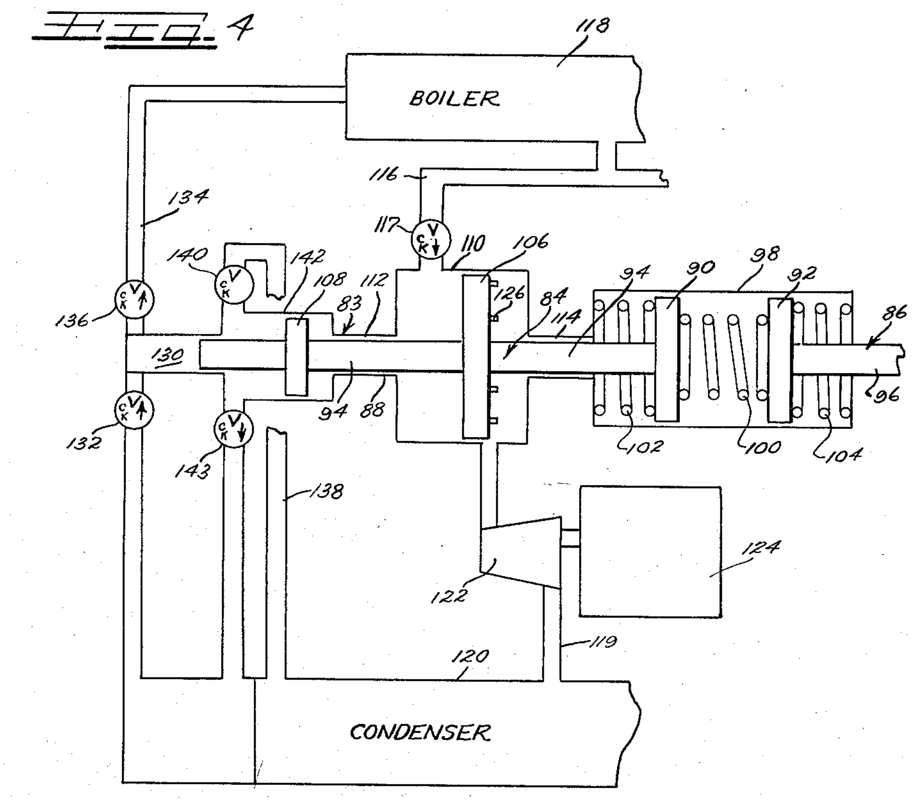
FIG. 5
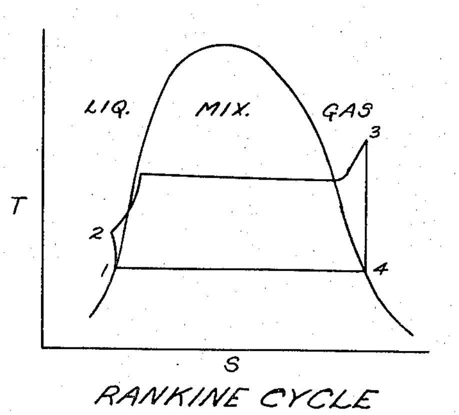
RANKINE CYCLE
FIG. 6
BRAYTON CYCLE
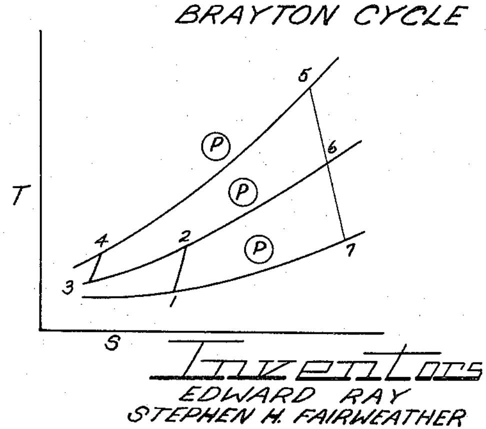
Inventors
EDWARD RAY
STEPHEN H. FAIRWEATHER
By Hill, Sherman, Meroni, Gross & Simpson Attys United States Patent Office 2,988,874

Patented June 20, 1961

2,988,874

FREE PISTON POWER CONVERSION DEVICES

Edward Ray, Cleveland, and Stephen H. Fairweather, Lyndhurst, Ohio, assignors to Thompson Ramo Wooldridge Inc., a corporation of Ohio Filed May 9, 1958, Ser. No. 734,254
12 Claims. (Cl. 60—21)

This invention relates to free piston power conversion means and more particularly to free piston means driven by Rankine and Brayton cycle engines or the like and adapted for use in energizing electric power generators, turbines or the like.

Heretofore, power conversion systems have generally required crank shaft means which have entailed metal-to-metal contact and have necessitated extensive reinforcing and lubricating means. Also, their use has been limited by the temperature range which could be employed therewith so that relatively inefficient power conversion cycles were obtained, and the low heat sink temperatures used have required large radiator areas.

The present invention overcomes the aforementioned disadvantages by means of a free piston power conversion means whose use is illustrated for the Rankine and Brayton cycles. The free piston means of the invention could also be used advantageously in other cycles, great flexibility being afforded as to the source of energy to be used, whether nuclear, solar or chemical. The choice of the type of cycle and its mechanization is dependent to a large extent upon the nature of the heat source, the heat sink, the environmental conditions and the amount and type of power required.

Accordingly, it is an object of the present invention to provide a free piston power conversion mechanism for use in a Rankine cycle or a Brayton cycle engine or in other engines, which requires no metal-to-metal contact anywhere and eliminates side loads on the piston so that long life operation is achieved.

Another object of the invention is to provide a free piston power conversion mechanism as described, wherein the process is intermittent so that higher temperature cycles may be employed than have been available for use in turbo-machinery, with consequently higher cycle efficiency.

Another object of the invention is to provide a power conversion mechanism as described wherein the heat sink temperature may be higher because of the fact that the higher cycle temperatures are available, thereby reducing the radiator area required for the low temperature sink.

Another object of the invention is to provide a power conversion mechanism which is especially advantageous where moderate power requirements are involved and low specific speed equipment is utilized. In the case of Brayton cycle engines, component inefficiencies might make the generation of power impossible in turbo-machinery.

Another object of the invention is to provide a mechanism as described which is inherently balanced and affords no reaction forces on the vehicle.

Another object of the invention is to provide a power conversion mechanism which, with respect to the Rankine cycle device, is adapted to tolerate the condensation of liquid during the expansion process.

Another object of the invention, with respect to the Brayton cycle device, is to provide a system which eliminates problems associated with condensation in a gravitationless field.

Another object is to provide a Brayton cycle device according to the invention which permits direct cooling of a nuclear heat source without an additional heat exchange medium and with but negligible effect on reactivity.

Another object is to provide a Brayton cycle device as described, wherein corrosion problems are reduced to a minimum.

Yet another object of the invention is to provide a Brayton device which affords negligible working fluid weights.

Other objects and advantages of the invention will become apparent as the description proceeds in accordance with the drawings, in which:

FIGURE 4 is a schematic view of a Brayton cycle power conversion mechanism, according to the invention;

FIGURE 5 is a diagrammatic showing of the Rankine cycle for the device of FIGURE 1; and FIGURE 6 is a diagrammatic showing of the Brayton cycle for the device of FIGURE 4.

Figure 1:
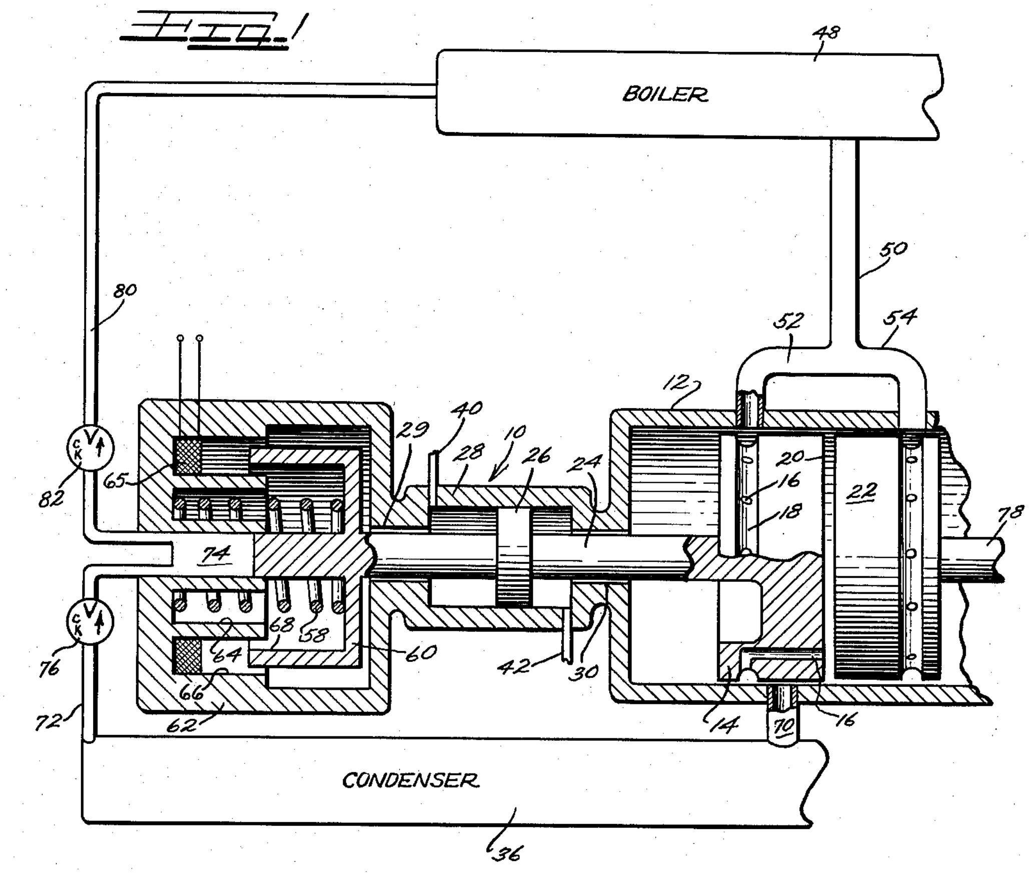
FIGURE 1 is a schematic diagram of a Rankine cycle power conversion mechanism according to the present invention.

Referring now to FIGURE 1, a power conversion mechanism 10 is shown of the Rankine cycle type which operates on a free piston principle according to the concept of the present invention. This principle permits an inherently balanced load to be utilized at all times, with no reaction forces on a vehicle with which it may be used, and eliminates metal-to-metal contact and the need for crankshaft devices and the like, as hereinabove set forth.

A casing 12 is provided which slidably receives a free piston 14 defining a plurality of passages 16 opening into an annular groove 18 in the piston and extending radially inwardly from the groove 18 and then axially to the face 20 of the piston. A free piston 22 is slidably received in the casing 12 in opposed coaxial relationship to the piston 14 and having a similar structure to provide a balance of forces as stated.

Figure 2:
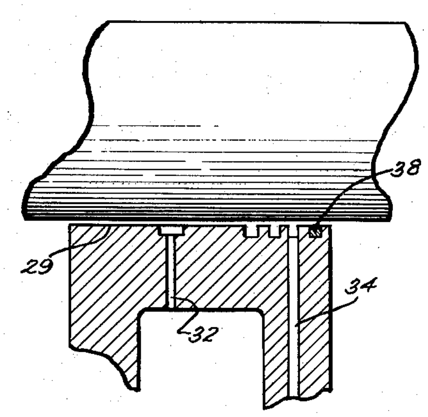
FIGURE 2 is an enlarged fragmentary view of bearing means for the device of FIGURE 1.

The shaft 24 of the piston 14 includes a secondary piston element 26 which is slidably received in a cylindrical casing 28 defining bores 29 and 30 each having bearing means such as the hydrostatic bearing passage 32 seen in communication with bore 29 in FIGURE 2 and supplied with high pressure fluid from suitable pump means (not shown). As also seen with respect to the bore 29, each of the bores 29 and 30 includes a labyrinth seal passage 34 leading to a condenser 36 for the device and graphite seal means 38.

Figure 3:
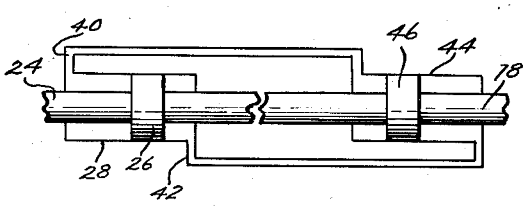
FIGURE 3 is a fragmentary schematic view of liquid synchronizing linkage means for the device of FIGURE 1.

In order to synchronize the pistons 14 and 22, the casing 28 is provided with conduits 40 and 42 leading therefrom as seen in FIGURE 3 and communicating with a casing 44 which is shown schematically in association with a secondary piston 46 for the piston 22 and corresponding to the piston 26 for piston 14. The hydrostatic forces transmitted through the passages 40 and 42 thus provide a synchronizing link for the pistons 14 and 22.

In order to actuate the pistons 14 and 22, a boiler 48 is provided having a conduit 50 leading therefrom and communicating with the interior of the casing 12 by means of bifurcated pipes or conduits 52 and 54. The outlet ends of the conduits 52 and 54 are in register with the grooves in the pistons 14 and 22, such as the groove 18 in piston 14, when the pistons are in an initial substantially end-to-end relationship as urged by bounce springs such as the bounce spring 58, which bears against a cup-shaped actuator 60 on the shaft 24 of piston 14 at one end and against a cylindrical casing 62 at the other end. The casing 62 defines an annular recess 64 for receiving the spring 58 and a coaxial recess 66 in which the sleeve portion 68 of the actuator 60 is telescopically received in reciprocating relationship, the casing 62 being provided with suitable electrical power generation coils 65 in accordance with the understanding of those skilled in the art. The piston 60 may, for example, be of a magnetic character such as to effect a change in flux during reciprocation and thus induce current in the coils 65, so as to generate power for use elsewhere. Thus vapor introduced through the passages 16 in the piston 14 and corresponding passages in the piston 22 from the conduits 52 and 54 will urge the pistons away from one another, while the bounce springs such as the spring 58 will return the pistons after such movement to afford a continuous, balanced piston cycle. The synchronizing means shown in FIGURE 3 will, as stated, maintain the pistons in corresponding positions throughout the cycle.

The outlet ends of the conduits 54 and 52 cooperate with the pistons 14 and 22 to provide pneumatic valves, which are automatically closed when the pistons are moved away from each other by the above-described expansion phase. After the pistons have moved apart sufficiently, the vapor is free to pass into the condenser 36 through conduits such as the conduit 70, particularly as urged to do so during the return of the pistons afforded by the bounce springs. This return action of the pistons will also serve to create a type of vacuum condition which will draw fluid from the condenser 36 through a conduit 72 and into a bore 74 defined in the casing 62, a suitable check valve 76 being provided in the conduit 72 for this purpose. When the pistons 14 and 22 have been returned to their initial positions and are again moved apart by expanding vapor from the conduits 52 and 54, the end of the piston shaft 24 will pump fluid through a conduit 80 having a check valve 82, into the boiler 50, the right hand side of the system having a similar conduit (not shown) for transmitting fluid to the boiler which has been pumped by the piston shaft 78 of the piston 22. The respective phases of this Rankine cycle are diagrammatically seen in FIG. 5.

Referring now to FIGURE 4, a second embodiment of the invention is schematically shown wherein a free piston mechanism 83 is operated by means of a Brayton cycle system. The free piston mechanism 83 includes a pair of pistons 84 and 86 slidably received in a casing 88, the pistons having abutment flanges 90 and 92, respectively, at adjacent ends of their shafts 94 and 96 slidably disposed within a casing section 98. The pistons are urged away from one another by a spring 100 bearing at its ends against the flanges 90 and 92, while bounce springs 102 and 104 urge the pistons in a return direction, the springs 100, 102 and 104 having relative forces such as to afford a synchronized reciprocating movement of the pistons as hereinafter set forth. Each of the pistons 84 and 86 has a relatively large piston head such as the head 106 for the piston 84 and a compression piston head such as the piston head 108 on the piston 84. As seen with respect to the piston 84, the relatively large piston heads are received in a casing portion such as indicated at 110. The casing portion 110 defines bores 112 and 114 at either end for the shaft 94, hydrostatic gas being supplied thereto by bleed air from the compressor for bearing purposes. The casing 110 is connected by a conduit 116 to a heat source tank 118 adjacent the end further from the casing section 98, and by a conduit 119 to a heat sink tank 120 adjacent the end closer to the casing section 98, and a turbine 122 is disposed in the conduit 119 for driving an alternator 124.

When heated gas from the heat source tank 118 is introduced into the casing 110 through pneumatic valve means 117 which may be provided in the outlet portion of the conduit 116, therefore, the piston 84 moves to compress the spring 100 in synchronous relationship with the piston 86, as assisted by the bounce spring 102, to energize the turbine 122. The valve 117 may be a check valve of conventional type so that heated gas will enter the casing 110 when piston 106 moves to the right, and this action may be assisted by the reduction of pressure in the casing afforded by such movement. The valve 117 may thus prevent the escape of the heated gas through conduit 116 after its entry into the casing 110, although it is noted that under certain pressure conditions in the heat source tank 118 it may be possible to dispense with the said check valve or pneumatic valve 117. A plurality of nozzles 126 may be formed in the piston head 106 to this end. During this movement, gas will be drawn from the heat sink tank 120 through conduit 138 by the piston shaft 94 and into a bore 130, through a check valve 132, as set forth in the preceding embodiment. The return action of the piston 84 serves to pump the gas through a conduit 134 having a check valve 136 into the heat source tank 118, so that a continuous Brayton cycle is provided, as seen in FIGURE 6. The initial movement of the piston 84 to the right also serves to draw gas through a conduit 138 and a check valve 140 into the casing portion 142 for the compressor piston head 108, from a low pressure side of the heat sink tank 120 receiving the decompressed gases from the turbine as described. Thereupon the return movement of the piston 84 drives the compression piston head 108 to the left to pump the gas through a high pressure side of the heat sink 120 to assist the recycling of gas to the heat source tank 118 afforded by the action of the piston shaft 94, and valve 143.

There has thus been provided a free piston power conversion system which may be adapted to use with a variety of thermo-dynamic cycles, and for a variety of power conversion devices, the system having been illustrated with respect to Rankine cycle and Brayton cycle means and with generator and turbine means, respectively. The system affords great advantages in the range of applications possible, the temperatures at which the system is effective, and the reduction in friction and elimination of unbalanced loads, while maintaining a simplicity and power conversion efficiency which provide long-lasting operation in an exceptionally economical manner.

Although we have described our invention with respect to specific principles and details thereof, it will be obvious to those skilled in the art that these may be varied without departing from the spirit and scope of the invention as set forth in the hereunto appended claims.

We claim as our invention:

1. A power conversion device comprising a casing, a pair of pistons slidably received in said casing in coaxial alignment, each of said pistons having a piston head at one end thereof adjacent the piston head of the other piston, each of said piston heads defining a passage extending from a side portion thereof to the face thereof opposite the other piston head, means biasing said pistons to an initial position, a boiler, conduit means leading from said boiler to said casing and opening in register with the end of said passage in the side portion of each of said piston heads, a condenser, a conduit for each of said pistons leading from said casing to said condenser, said conduits leading to said condenser being closed by said piston in an initial position thereof, said pistons moving away from each other in response to fluid from said boiler to close said conduits from said boiler and to open said conduits to said condenser, resilient means urging said pistons toward one another, said casing defining a bore for each of the other ends of said pistons, a conduit leading from said condenser to each of said bores having a check valve therein, and a conduit having a check valve leading from each of said bores to said boiler whereby reciprocating movement of said pistons is effective to pump fluid from said condenser to said boiler.

2. A power conversion device comprising a casing, a pair of pistons slidably received in said casing in coaxial alignment, each of said pistons having a piston head at one end thereof adjacent the piston head of the other piston, each of said piston heads defining a passage extending from a side portion thereof to the face thereof opposite the other piston head, means biasing said pistons to an initial position, a boiler, conduit means leading from said boiler to said casing and opening in register with the end of said passage in the side portion of each of said piston heads, a condenser, a conduit for each of said pistons leading from said casing to said condenser, said conduits leading to said condenser being closed by said piston in an initial position thereof, said pistons moving away from each other in response to fluid from said boiler to close said conduits from said boiler and to open said conduits to said condenser, resilient means urging said pistons toward one another, conduit means leading from said condenser to said boiler, means for transmitting fluid through said conduit means from said condenser to said boiler, a synchronizing piston head on each of said pistons, said casing defining a casing section for each of said synchronizing piston heads, a conduit between one side of one of the casing sections and the other side of the other casing section, a conduit between the other side of said one casing section and the other side of the other casing section and hydraulic fluid in said casing sections and said conduits cooperating with said synchronizing piston heads to synchronize said pistons.

3. A power conversion device comprising a casing, a pair of pistons slidably received in said casing in coaxial alignment, each of said pistons having a piston head at one end thereof adjacent the piston head of the other piston, each of said piston heads defining a passage extending from a side portion thereof to the face thereof opposite the other piston head, means biasing said pistons to an initial position, a boiler, conduit means leading from said boiler to said casing and opening in register with the end of said passage in the side portion of each of said piston heads, a condenser, a conduit for each of said pistons leading from said casing to said condenser, said conduits leading to said condenser being closed by said piston in an initial position thereof, said pistons moving away from each other in response to fluid from said boiler to close said conduits from said boiler and to open said conduits to said condenser, resilient means urging said pistons toward one another, said casing defining a bore for each of the other ends of said pistons, a conduit leading from said condenser to each of said bores having a check valve therein, a conduit having a check valve leading from each of said bores to said boiler whereby reciprocating movement of said pistons is effective to pump fluid from said condenser to said boiler, a synchronizing piston head on each of said pistons, said casing defining a casing section for each of said synchronizing piston heads, a conduit between one side of one of the casing sections and the other side of the other casing section, a conduit between the other side of said one casing section and the other side of the other casing section and hydraulic fluid in said casing sections and said conduits cooperating with said synchronizing piston heads to synchronize said pistons.

4. A power conversion device comprising a casing, a pair of coaxially aligned pistons in said casing, each of said pistons having a piston head at one end, a cup-shaped actuator adjacent the other end and a shaft portion extending through the cup-shaped actuator, said casing defining a bore receiving each of said shaft portions, spring means in said casing bearing on each of said cup-shaped actuators and urging said pistons toward one another, electrical power generation means at each end of said casing, a casing portion for each of said piston heads, a boiler, a condenser, a conduit leading from said boiler to each of said casing portions adjacent one end thereof, a conduit leading from each of said casing portions adjacent the other end thereof to said condenser, each of said piston heads having a passage opening in the side thereof opposite said conduit from said boiler when said piston is in an initial position to which it is urged by said spring means and opening at the face of said piston head opposite the other piston head, a conduit having a check valve leading from said condenser to each of said bores and a conduit having a check valve leading from each of said bores to said boiler, said piston heads closing said conduits from said boiler and opening said conduits to said condenser in response to expansion of fluid between said piston heads, said pistons pumping fluid from said condenser to said boiler during reciprocation thereof.

5. A free piston power conversion system comprising a casing structure, a pair of pistons slidably received in said casing structure in coaxial alignment with one another, each of said pistons having a piston head, said casing structure having a casing portion slidably receiving each of said piston heads, a source of fluid under pressure, means for introducing said fluid under pressure into each of said casing portions to move the piston heads in opposite directions, means for receiving the fluid in a decompressed condition, means leading from each of said casing portions to said means for receiving the fluid disposed in predetermined axially spaced relation to said means for introducing fluid under pressure into said casing portions, bounce means for returning the pistons to an initial position, and means for transmitting fluid from the means for receiving the fluid to said source of fluid under pressure, said pistons forming pump means for moving fluid through said transmitting means.

6. In a free piston power conversion system, a casing structure, a pair of pistons slidably received in said casing structure in coaxial alignment with one another, a piston head on each of said pistons, a casing portion for each of said piston heads, a source of fluid under pressure, means for receiving fluid in a relatively low pressure condition, means leading from said source of fluid under pressure to one side of each of said casing portions to move said pistons in opposite directions, means leading from the other side of each of said casing portions to said means for receiving fluid, said casing structure forming reduced bores receiving a reduced end portion of the piston shafts of each of said pistons, conduit and check valve means leading from said means for receiving fluid to each of said bores, conduit and check valve means leading from each of said bores to said source of fluid under pressure and bounce means for returning each of said pistons to an initial position, said reduced ends of said pistons intermittently pumping fluid from said conduit and check valve means leading from said means for receiving fluid through said conduit and check valve means leading from each of said bores to said source of fluid.

7. A power conversion device comprising a casing, a pair of pistons slidably received in said casing in coaxial alignment, each of said pistons having a piston head at one end thereof adjacent the piston head of the other piston, each of said piston heads defining a passage extending from a side portion thereof to the face thereof opposite the other piston head, means biasing said pistons to an initial position, a boiler, a conduit structure leading from said boiler to said casing and opening in register with the end of said passage in the side portion of each of said piston heads, a condenser, a conduit for each of said pistons leading from said casing to said condenser, said conduits leading to said condenser being closed by said pistons in an initial position thereof, said pistons being moved away from each other in response to fluid from said boiler to close said conduits from said boiler and to open said conduits to said condenser, resilient means urging said pistons toward one another, conduit means leading from said condenser to said boiler, and pumping means positioned in said conduit means and connected to said pistons for intermittently pumping fluid through said conduit means from said condenser to said boiler.

8. A power conversion device comprising a casing, a pair of pistons slidably received in said casing in coaxial alignment, each of said pistons having a piston head at one end thereof adjacent the piston head of the other piston, each of said piston heads defining an annular groove and a passage extending from said annular groove to the face thereof opposite the other piston head, a boiler, means biasing said pistons to an initial position, a conduit structure leading from said boiler to said casing and opening in register with the end of said passage in the side portion of each of said piston heads, a condenser, a conduit for each of said pistons leading from said casing to said condenser, said conduits leading to said condenser being closed by said piston in an initial position thereof, said pistons moving away from each other in response to fluid from said boiler to close said conduits from said boiler and to open said conduits to said condenser, resilient means urging said pistons toward one another, conduit means leading from said condenser to said boiler, and pumping means positioned in said conduit means and connected to said pistons for intermittently pumping fluid through said conduit means from said condenser to said boiler.

9. A power conversion device comprising a casing, a pair of pistons in said casing in coaxial alignment, a piston head for each of said pistons, a casing portion for each of said piston heads, a heat source providing fluid under pressure, a heat sink, a conduit from said heat source to each of said casing portions adjacent one end thereof, a conduit leading from each of said casing portions adjacent the other end thereof to said heat sink, bounce means for returning the pistons to an initial position, a turbine in said conduits leading to said heat sink, said casing defining a bore for the ends of said pistons further removed from one another, a conduit having a check valve and leading from said heat sink into each of said bores and a conduit having a check valve and leading from each of said bores to said heat source, the said ends of said pistons intermittently pumping fluid from said heat sink through the conduits leading therefrom to said bores and from said bores to said heat source through the conduits leading from said bores to said heat source.

10. A power conversion device comprising a casing, a pair of pistons in said casing in coaxial alignment, a piston head for each of said pistons, a casing portion for each of said piston heads, a heat source providing fluid under pressure, a heat sink, a conduit from said heat source to each of said casing portions adjacent one end thereof, a conduit leading from each of said casing portions adjacent the other end thereof to said heat sink, said casing defining a bore for the ends of said pistons further removed from one another, a conduit having a check valve and leading from said heat sink into each of said bores, a conduit having a check valve and leading from each of said bores to said heat source, an abutment flange adjacent the opposite end of each of said pistons, a casing portion for said abutment flanges, a spring between said abutment flanges, and bounce means for returning the pistons to an initial position including a spring between the ends of said casing portion for said abutment flanges and said abutment flanges, the said ends of said pistons further removed from one another intermittently pumping fluid from said heat sink through the conduits leading therefrom to said bores and from said bores to said heat source through the conduits leading from said bores to said heat source.

11. In a free piston conversion system, a casing structure, a pair of pistons slidably received in said casing structure in coaxial alignment with one another, a piston head and a piston shaft on each of said pistons, a casing portion for each of said piston heads, a source of fluid under pressure, means for receiving fluid in a relatively low pressure condition, means leading from said source of fluid under pressure to one side of each of said casing portions to move said pistons in opposite directions, means leading from the other side of each of said casing portions to said means for receiving fluid, a bore defined in said casing structure receiving an end portion of the piston shaft of each of said pistons, conduit and check valve means leading from said means for receiving fluid to each of said bores, conduit and check valve means leading from each of said bores to said source of fluid under pressure, bounce means for returning each of said pistons to an initial position, and secondary piston means on said pistons responsive to the position of said pistons in said casings whereby said pistons are reciprocated in unison, said end portions of said pistons intermittently pumping fluid from said conduit and check valve means leading from said means for receiving fluid through said conduit and check valve means leading from each of said bores to said source of fluid.

12. A power conversion device comprising a casing, a pair of pistons in said casing in coaxial alignment, a piston head for each of said pistons, a casing portion for each of said piston heads, a heat source providing fluid under pressure, a heat sink having a high pressure side and a lower pressure side, a conduit leading from said heat source to each of said casing portions adjacent one end thereof, a conduit leading from each of said casing portions adjacent the other end thereof to the low pressure side of said heat sink, bounce means for returning the pistons to an initial position, said casing defining a bore for each of said pistons including a bore portion for the end of said pistons further removed from one another, a compressor piston head on each of said pistons, a casing section for each of said compressor piston heads, a conduit having a check valve leading from said heat sink at the low pressure side thereof to each of said compressor casing sections at the end adjacent said bore portion therefor, a conduit having a check valve and leading from each of said compressor casing sections at the end adjacent said bore portion therefor to said heat sink at the high pressure side thereof, a conduit for each of said bore portions having a check valve and leading from said heat sink at the high pressure side thereof into the bore portion therefor, and a conduit for each of said bore portions having a check valve and leading from the bore portion therefor to said heat source, said compressor piston heads pumping fluid from the low pressure to the high pressure side of said heat sink and the said ends of said pistons pumping fluid from the high pressure side of said heat sink to said heat source through said conduits leading from the high pressure side of heat sink to said bore portions and through the conduits leading from said bore portions to said heat source.

References Cited in the file of this patent

UNITED STATES PATENTS

| | | |
|---|---|---|
| 1,615,133 | Pateras Pescara | Jan. 18, 1927 |
| 1,678,309 | Swartwout | July 24, 1928 |
| 1,805,931 | Taylor | May 19, 1931 |
| 1,865,909 | Hinchcliffe et al. | July 5, 1932 |
| 2,075,133 | Pateras Pescara | Mar. 30, 1937 |
| 2,429,035 | Steving | Oct. 14, 1947 |
| 2,473,204 | Huber | June 14, 1949 |
| 2,811,958 | Rousch | Nov. 5, 1957 |